United States Patent
Banks

(10) Patent No.: US 7,436,956 B2
(45) Date of Patent: Oct. 14, 2008

(54) DOCUMENT ENCRYPTION

(75) Inventor: David Murray Banks, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1183 days.

(21) Appl. No.: 10/177,203

(22) Filed: Jun. 21, 2002

(65) Prior Publication Data

US 2003/0007637 A1 Jan. 9, 2003

(30) Foreign Application Priority Data

Jul. 5, 2001 (GB) .................................. 0116439.1

(51) Int. Cl.
*H04L 9/00* (2006.01)
(52) U.S. Cl. .............................. 380/51; 380/37; 380/46; 380/55; 380/56; 713/170; 713/194
(58) Field of Classification Search .................. 380/51, 380/55, 56, 37, 46; 713/170, 194
See application file for complete search history.

(56) References Cited

U.S. PATENT DOCUMENTS

| | | | | |
|---|---|---|---|---|
| 4,751,733 A * | 6/1988 | Delayaye et al. | ............... | 380/42 |
| 4,837,737 A * | 6/1989 | Watanabe | .................... | 715/529 |
| 5,113,444 A * | 5/1992 | Vobach | ......................... | 380/47 |
| 5,321,748 A | 6/1994 | Zeidler et al. | | |
| 5,323,313 A * | 6/1994 | Davis et al. | .................. | 715/531 |
| 5,343,530 A * | 8/1994 | Viricel | .......................... | 705/67 |
| 5,467,447 A * | 11/1995 | Vogel | .......................... | 715/500 |
| 5,590,258 A * | 12/1996 | Aoyama | ...................... | 715/531 |
| 5,666,411 A * | 9/1997 | McCarty | ...................... | 705/51 |
| 5,699,427 A * | 12/1997 | Chow et al. | .................. | 705/58 |
| 5,870,470 A | 2/1999 | Johnson et al. | ............. | 380/285 |
| 5,909,494 A * | 6/1999 | Blaze | ........................... | 380/37 |
| 6,373,947 B1 * | 4/2002 | Pomerantz et al. | ........... | 380/212 |
| 6,490,353 B1 * | 12/2002 | Tan | .............................. | 380/37 |
| 6,678,694 B1 * | 1/2004 | Zimmermann et al. | ....... | 707/102 |
| 6,804,355 B1 * | 10/2004 | Graunke | ....................... | 380/37 |
| 6,836,239 B2 * | 12/2004 | Scott | ........................... | 342/176 |
| 6,934,388 B1 * | 8/2005 | Clark | ........................... | 380/47 |
| 6,941,460 B2 * | 9/2005 | Carro et al. | .................. | 713/170 |
| 6,944,344 B2 * | 9/2005 | Imagawa et al. | ............. | 382/229 |
| 7,162,453 B1 * | 1/2007 | Tenorio | ........................ | 705/64 |
| 7,277,542 B2 * | 10/2007 | Duval | ........................... | 380/37 |
| 2002/0078343 A1 * | 6/2002 | Rubin et al. | ................. | 713/153 |

(Continued)

FOREIGN PATENT DOCUMENTS

WO WO97/44736 11/1997

OTHER PUBLICATIONS

Alfred J. Menezes, Paul C. van Oorschot, Scott A. Vanstone; Handbook of Applied Cryptography, 1997, CRC, Press LLC; pp. 15-21.*

(Continued)

*Primary Examiner*—Carl Colin

(57) ABSTRACT

Encryption of documents is used to restrict access to such documents to those users who have the appropriate decryption keys. The encryption of documents on public web servers hitherto has prevented indexing by search engines. By keeping words and possible sentences or paragraphs intact in the encrypted document but re-ordering elements of the document to prevent the document being human-readable, the possibility of encrypted documents being indexed by search engines is provided.

19 Claims, 4 Drawing Sheets

U.S. PATENT DOCUMENTS

2002/0150240 A1* 10/2002 Henson et al. ............... 380/44

OTHER PUBLICATIONS

Dawn Xiaodong Song, David Wagner, Adrian Perrig; "Practical Techniques for Searches on Encrypted Data"; 2000; IEEE Symposium on Security and Privacy; pp. 1-12.*

Bruce Schneier; "Applied Cryptography, Second Edition: Protocols, Algorthms, and Source Code in C"; (Publisher: John Wiley & Sons, Inc.); 1996; Chapters 9 and 13; and chapter/section (23.15) (one page).*

Dorothy Elizabeth Robling Denning "Cryptography and Data Security"; 1982; Addison-Wesley Publishing Company, Inc.; Chapter 3, pp. 135-190.*

* cited by examiner

DOCUMENT ENCRYPTION

This invention relates to the encryption of documents and in particular the encryption of text documents.

One technique to restrict access to documents is to encrypt the documents so that they are not human-readable until they are decrypted. This is a well-known technique and is frequently used in conjunction with a decryption key to prevent unauthorised viewing or access to documents.

This technique may also be used for documents held on a public web server. However, one drawback with present encryption techniques is that encrypted documents cannot easily be indexed by search engines since search engines also require access to human readable keywords and phrases in order to assess the relevance and content of the document for indexing purposes.

In accordance with a first aspect of the invention there is provided a method of encrypting a text document comprising uniquely identifying a plurality of subset elements of the document, generating a random indicator indicative of one of the subset elements, and moving the subset element indicated by the random indicator to a different position within the document, the subset elements of the document being chosen to be interpretable by a search engine algorithm whereby the document meaning is sufficiently retained after encryption to permit indexing by the search engine algorithm.

Preferably, the subset elements will be words, sentences, paragraphs and/or chapters of the document. By re-ordering the subset elements, the readability of the document is reduced preferably, to the point where a human reader can make no sense of the document. However, by ensuring that at the very least, words remain intact in the document (although not necessarily in the correct order), a search engine may extract key words during indexing. More preferably, larger "granularity" is used (for example sentences, chapters or paragraphs) which allows search engines to index complete phrases and thereby improve the categorisation of the document. In a large document of many pages, re-ordering of large chunks such as paragraphs or chapters is still successful in preventing a human reader from making sense of the document.

In accordance with a second aspect of the invention, a method of encrypting a text document encrypted according to the first aspect above comprises uniquely identifying a plurality of predetermined subset elements of the document, receiving a starting state for generating a random indicator, generating a random indicator indicative of one of the subset elements, and moving the subset element indicated by the random indicator to a different position within the document.

In a third aspect, the invention provides an encrypted document comprising a text document in which predetermined subset elements of the original document have been reordered using a predetermined and reversible process and wherein the subset elements are chosen to be interpretable by a search engine algorithm whereby the document meaning of the encrypted document is sufficiently retained to permit indexing by a search engine algorithm.

In a further aspect, the invention provides encryption apparatus for encrypting a text document comprising a subset identifier arranged to uniquely identify a plurality of subset elements of the document, a random indication generator arranged to generate a random indicator indicative of one of the subset elements, and an element mover arranged to move a subset element indicated by a random indicator generated by the random indication generator, to a different position within the document, the subset elements of the document being chosen to be interpretable by a search engine algorithm whereby the document meaning is sufficiently retained after encryption to permit indexing by the search engine algorithm.

Correspondingly, in a yet further aspect, the invention provides decryption apparatus for decrypting a text document encrypted according to the first method aspect above comprises a subset identifier arranged to uniquely identify a plurality of predetermined subset elements of the document, a random indication generator arranged to generate a random indicator indicative of one of the subset elements, a key receiver arranged to receive a starting state for the random indication generator, and an element mover arranged to move a subset element indicated by a random indicator generated by the random indicator generator, to a different position within the document.

Embodiments of the invention will now be described by way of example with reference to the drawings in which.

Figure 1A:
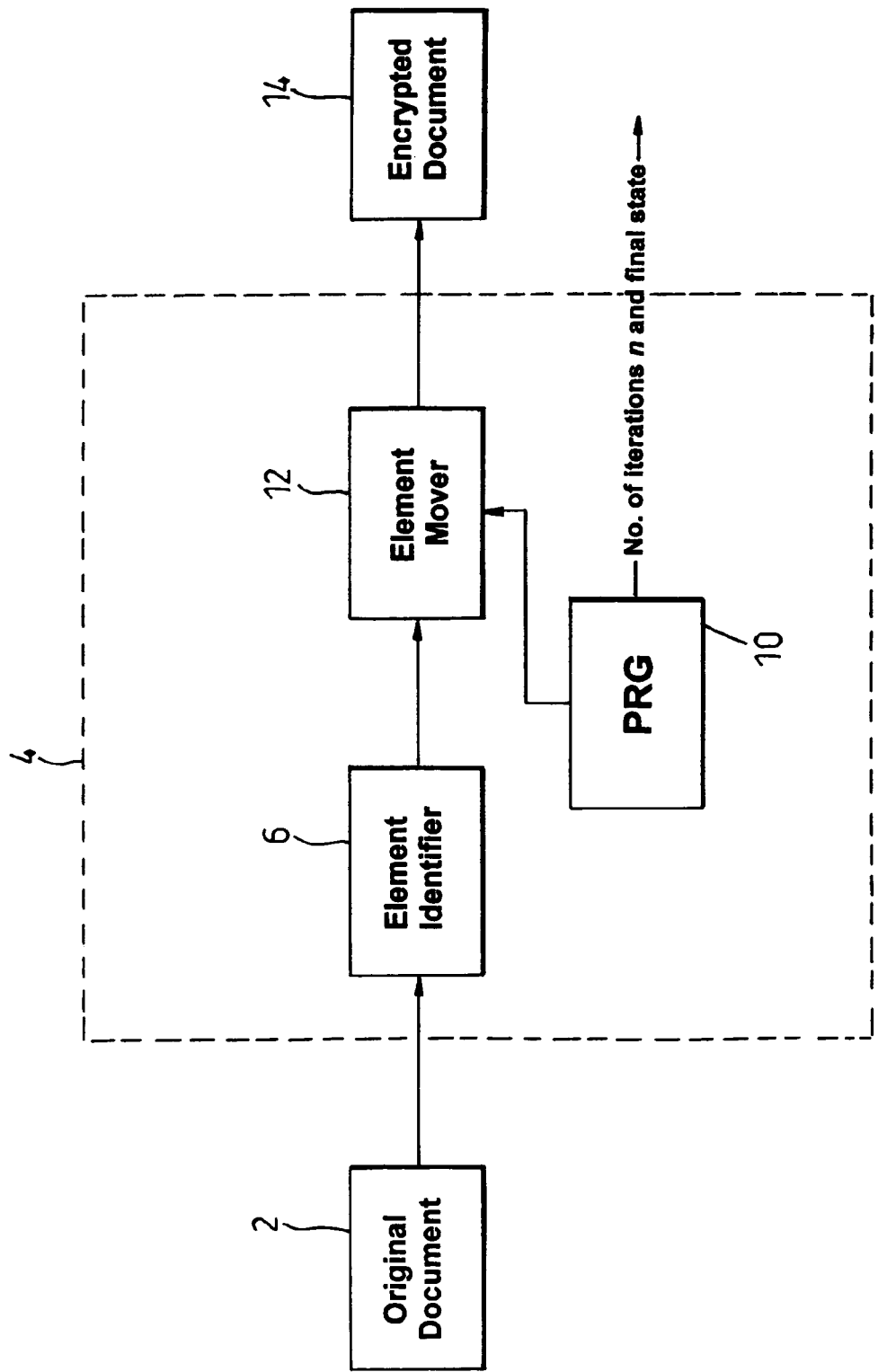
FIG. 1A is a schematic block diagram of encryption apparatus in accordance with the invention.
Figure 2:
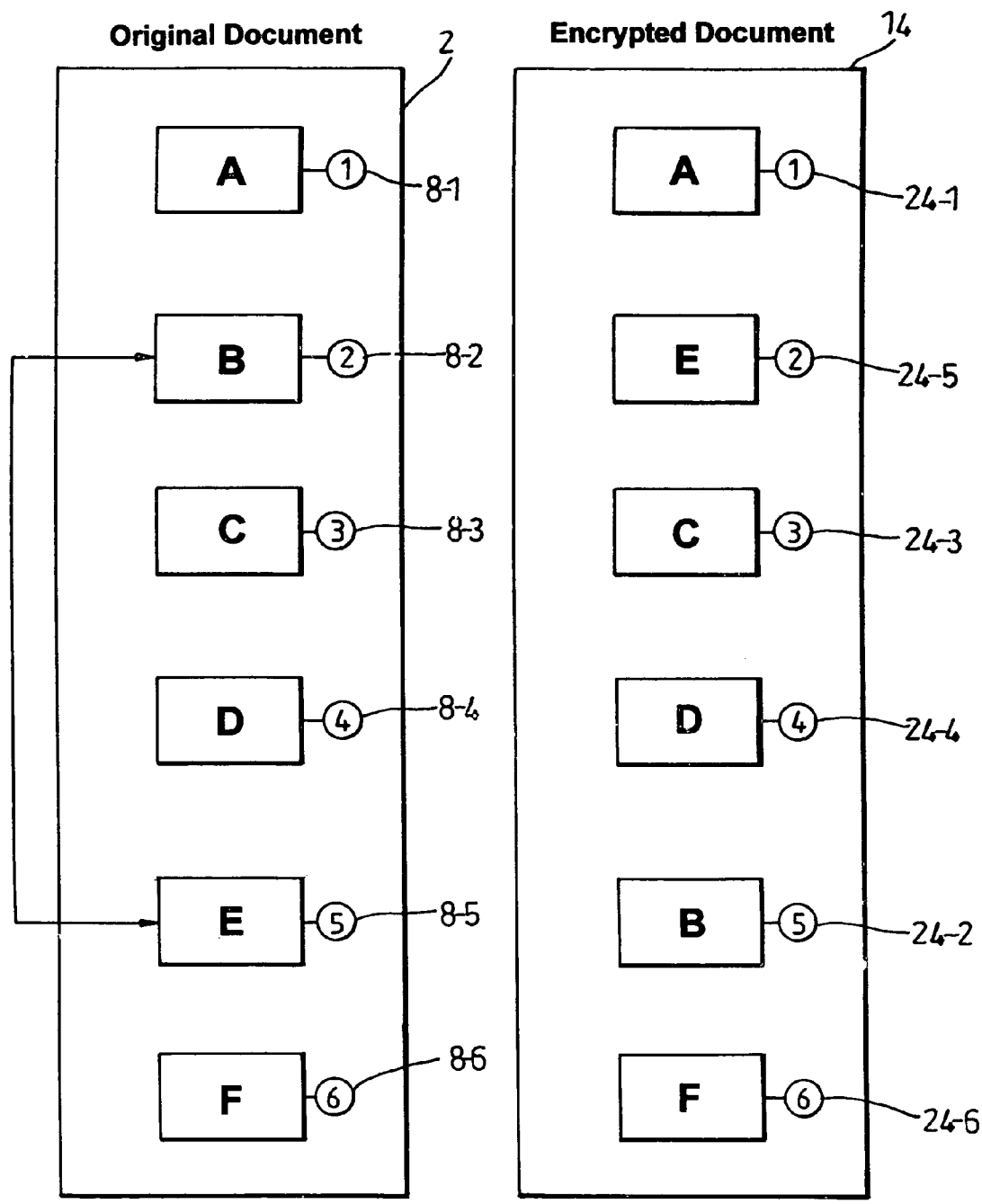
FIG. 2 is a schematic representation of the encryption process.

With reference to FIGS. 1A and 2, a document 2 (for example, a word processor file) is passed into the encryption apparatus 4.

Firstly, the document is scanned to identify each of the elements. For example, if the elements are sentences then tags are placed at the beginning and end of each sentence (which may, for example, be identified by searching for capital letters and full stops). The accuracy of this process is not particularly important as long as the process is repeatable and reversible. Documents such as HTML documents already include suitable paragraph tags in which case this step may optionally be skipped.

The apparatus 4 then marks each of the elements which are to be re-ordered during the encryption using an element identifier 6. With particular reference to FIG. 2, each of the elements A-F in the original document 2 are marked with a respective element identifier 8-1 to 8-6.

In the example presented below, each of the elements A-F is a sentence in the document.

A pseudorandom number generator 10 is then seeded with a number (which may, for example, be based on the original document, for example, using an MD5 hash value and generates a first pair of numbers in the pseudorandom sequence. (In this context, pseudorandom is taken to mean a repeatable sequence of numbers which has no relationship between the numbers in the sequence). Also, the output of the PRG 10 is preferably limited (typically using a module function) to be less than or equal to the total number of unique identifiers 8-1 to 8-6.

In this example, the first two numbers in the sequence are 2 and 5 which are the unique identifiers 8-2 and 8-5.

In the algorithm shown in this example, once a pair of element identifiers have been selected, the elements are swapped by an element mover 12 so that in the encrypted document elements B and E are reversed.

It will be appreciated that this is a simplified example and that the re-ordering of the sentences would be carried out many times in order to make the document unreadable by human reader. One option for determining the number of iterations is to apply a deterministic function to the number of sentences in the document in order to assess its length. A longer document will probably need more iterations in order to ensure that all sentences or paragraphs are adequately "shuffled" to ensure non-readability.

Once the predetermined number of iterations has been completed, the encrypted document 14, the final state of the pseudorandom number generator 10 and the number of iterations are passed out of the apparatus 4.

The final state of the pseudorandom number generator and the number of iterations are used as a decryption key.

Figure 1B:
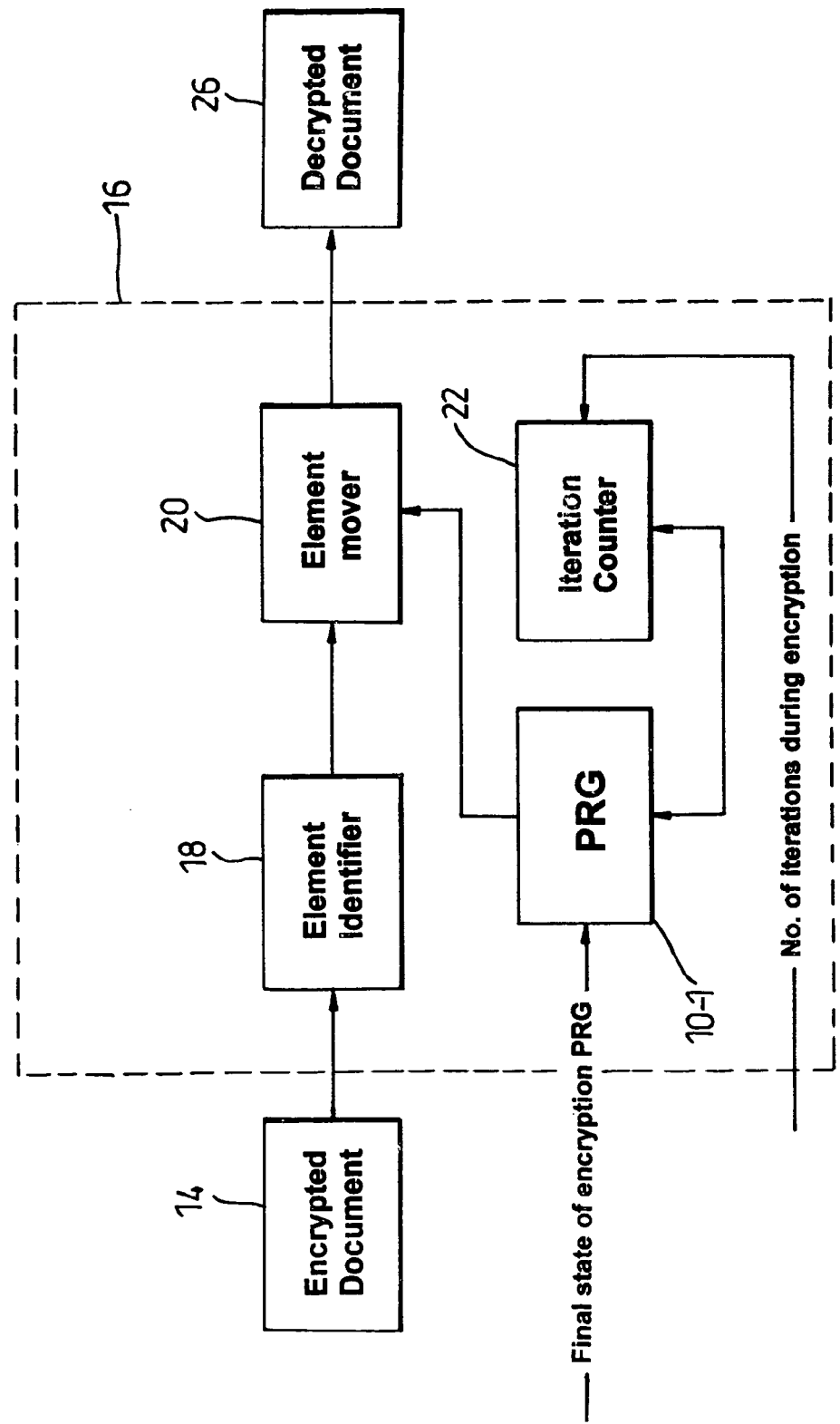
FIG. 1B is a schematic block diagram of decryption apparatus in accordance with the invention.
Figure 3:
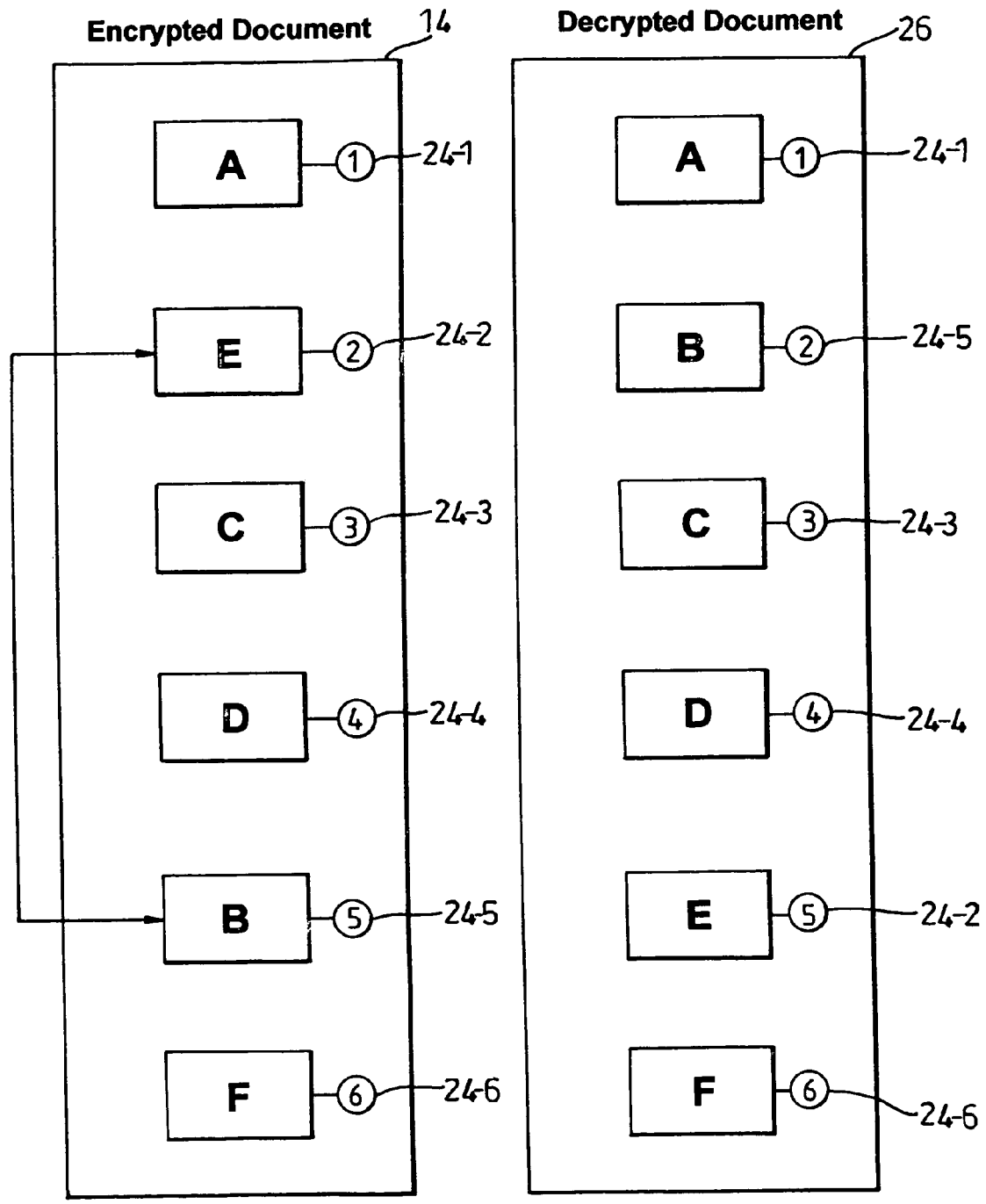
FIG. 3 is a schematic representation of the decryption process.

Thus, with reference to FIGS. 1B and 3, on receipt, the encrypted document 14 is fed into decryption apparatus 16 along with the final state of the pseudorandom number generator and the value n of the number of iterations.

An element identifier 18 then marks each of the elements of the document with respective unique identifiers 24-1 to 24-6. Also a pseudorandom number generator 10-1 equivalent to the one used to encrypt the document is fed with the final state of the pseudorandom number generator 10.

The pseudorandom number generator 10-1 is similar to the original pseudorandom number generator but preferably operates to produce the reverse sequence. Thus, fed with the final state of pseudorandom number generator 10, each iteration will produce the preceding number in the sequence which had been issued by the pseudorandom number generator 10. Therefore, during each iteration, the reverse order of the sequence is issued so that the first pair of numbers being issued by the pseudorandom number generator 10-1 is the last pair of numbers which were issued by the pseudorandom number generator 10.

In this example, only one pair of numbers has been used and thus the first pair of numbers coming out of the pseudorandom number generator 10-1 is 2 and 5. This uniquely identifies the paragraphs in second and fifth position (which were original paragraphs E and B). Thus, the element mover 20 reverses these paragraphs, an iteration counter (preloaded with the number of iterations performed during encryption) 22 is decremented by two and the iteration counter is checked for zero. Once the iteration counter has reached zero, the document decryption is complete. In this case, n equals 2 and therefore after one paragraph sorting process, the document 26 is returned to its original state with the paragraphs in the original order A-F.

In this example, the unique identifiers identify the positions of the elements rather than the elements themselves. Thus in subsequent moving operations, the repetition of position 2, for example, would cause paragraph E to be moved (since this was moved into position 2 in the moving operation described above).

An alternative technique is to allow the element identifiers to move with the elements. Thus in the example given above, the element E would always retain the element identifier 5. In this case, once a number has been issued by the pseudorandom number generator, a search of the document is undertaken to find the element identifier having that number.

Other variations on this basic technique are possible. For example, the pseudorandom number generator may not be a reversible generator. In this case, the decryption process includes running the pseudorandom number generator in the same direction as the direction used during encryption and storing the results so that they can then be retrieved in reverse order. Also, swapping of paragraphs or sentences may be replaced with an algorithm which, for example, chooses a single subset element and places it randomly, consistently or alternately at the beginning and/or end of the document.

Furthermore, the initial seed for the pseudorandom number generator need not be based on a function of the original document.

In the case of HTML documents and some word processor file formats, the need to scan the document to look for the beginning and end of word sentences and/or paragraphs and chapters may be unnecessary. This is because the file formats may already "tag" those portions of the document.

Furthermore, it may be desirable to ensure that the first few paragraphs of the document are not encrypted in order to enhance the understanding of the document by a search engine algorithm. This may be achieved by only providing element identifiers for subset elements starting a predetermined number of subset elements from the beginning of the document.

The invention claimed is:

1. A method of encrypting a text document comprising uniquely identifying a plurality of subset elements of the text document,
    generating a random indicator indicative of one of the subset elements, and
    during encryption, moving the subset element indicated by the random indicator to a different position within the text document, the subset elements of the text document being chosen to be interpretable by a search engine algorithm whereby the text document meaning is sufficiently retained after encryption to permit indexing by the search engine algorithm.

2. A method according to claim 1, wherein the moving of subset elements within the document is carried out a predetermined plurality of times.

3. A method according to claim 2, wherein a number of moving operations is determined generally according to document length.

4. A method according to claim 1, wherein a type of subset elements are selected from a group containing words, sentences, paragraphs, chapters and a predetermined number of words or characters forming a block of the document.

5. A method according to claim 4, wherein the type of subset element is selected according to the length of the document.

6. A method according to claim 1, wherein the or each random number is generated using a pseudorandom number generator and wherein an original seed value of the pseudorandom number generator is used as a decryption key.

7. A method according to claim 1, wherein a random number is generated using a reversible pseudorandom number generator and wherein a final state of the pseudorandom number generator is used as a decryption key.

8. A method according to claim 1, wherein the position to which the indicated subset element is moved is determined by generating a second random indicator indicative of a second subset element and wherein the first subset element takes the place of the second subset element.

9. A method according to claim 1, wherein a predetermined number of subset elements at the beginning and end of the document are left unencrypted.

10. A method of decrypting a text document encrypted by uniquely identifying a plurality of subset elements of the document, generating a random indicator indicative of one of the subset elements, and moving the subset element indicated by the random indicator to a different position within the document, the method of decrypting comprising:
    uniquely identifying a plurality of predetermined subset elements of the text document, wherein the subset elements of the text document have been chosen to be interpretable by a search engine algorithm whereby the text document meaning is sufficiently retained after encryption to permit indexing by the search engine algorithm, receiving a starting state for generating a random indicator, generating a random indicator indicative of one of the subset elements, and during decryption, moving the subset element indicated by the random indicator to a different position within the text document.

11. A method according to claim 10, wherein the type of subset elements are selected from a group containing words, sentences, paragraphs, chapters of the document and a predetermined number of words or characters forming a block of the document.

12. A method according to claim 10, wherein a random number is generated using a pseudorandom number generator and wherein an original seed value of the pseudorandom number generator is used as the starting state.

13. A method according to claim 10, wherein the or each random number is generated using a reversible pseudorandom number generator and wherein a final state of the pseudorandom number generator is used as the starting state.

14. Encryption apparatus for encrypting a text document comprising:

a subset identifier arranged to uniquely identify a plurality of subset elements of the text document, a computer executing at least a random indication generator arranged to generate a random indicator indicative of one of the subset elements, and during encryption, an element mover arranged to move a subset element indicated by a random indicator generated by the random indication generator, to a different position within the document, the subset elements of the document being chosen to be interpretable by a search engine algorithm whereby the document meaning is sufficiently retained after encryption to permit indexing by the search engine algorithm.

15. Decryption apparatus for decrypting text document encrypted by uniquely identifying a plurality of subset elements of the document, generating a random indicator indicative of one of the subset elements, and moving the subset element indicated by the random indicator to a different position within the document, the decryption apparatus comprising:

a subset identifier arranged to uniquely identify a plurality of predetermined subset elements of the text document, wherein the subset elements of the text document have been chosen to be interpretable by a search engine algorithm whereby the text document meaning is sufficiently retained after encryption to permit indexing by the search engine algorithm, a computer executing at least a random indication generator arranged to generate a random indicator indicative of one of the subset elements, a key receiver arranged to receive a starting state for the random indication generator and an element mover arranged to move a subset element indicated by a random indicator generated by the random indicator generator, to a different position within the text document during decryption.

16. A system of encrypting a text document comprising means for uniquely identifying a plurality of subset elements of the text document, means for generating a random indicator indicative of one of the subset elements, and means for moving the subset element indicated by the random indicator to a different position within the text document during encryption, the subset elements of the text document being chosen to be interpretable by a search engine algorithm whereby the text document meaning is sufficiently retained after encryption to permit indexing by the search engine algorithm.

17. The system according to claim 16, wherein a type of subset elements are selected from a group containing words, sentences, paragraphs, chapters and a predetermined number of words or characters forming a block of the document.

18. The system according to claim 17, wherein the type of subset element is selected according to the length of the document.

19. The system according to claim 16, wherein the position to which the indicated subset element is moved is determined by generating a second random indicator indicative of a second subset element and wherein the first subset element takes the place of the second subset element.

* * * * *